(12) United States Patent
Grenier

(10) Patent No.: US 8,606,560 B2
(45) Date of Patent: Dec. 10, 2013

(54) AUTOMATIC SIMULTANEOUS INTERPERTATION SYSTEM

(75) Inventor: Jean Grenier, Pantin (FR)

(73) Assignee: William Bonneton, Boulogne (FR)

( * ) Notice: Subject to any disclaimer, the term of this patent is extended or adjusted under 35 U.S.C. 154(b) by 455 days.

(21) Appl. No.: 12/742,298

(22) PCT Filed: Nov. 18, 2008

(86) PCT No.: PCT/FR2008/052077
§ 371 (c)(1),
(2), (4) Date: May 11, 2010

(87) PCT Pub. No.: WO2009/071795
PCT Pub. Date: Jun. 11, 2009

(65) Prior Publication Data
US 2010/0256972 A1  Oct. 7, 2010

(30) Foreign Application Priority Data
Nov. 19, 2007 (FR) ...................................... 07 59159

(51) Int. Cl.
*G06F 17/28* (2006.01)
(52) U.S. Cl.
USPC .................. 704/2; 704/9; 704/246; 704/247; 704/251; 704/252
(58) Field of Classification Search
USPC .......................... 704/2–9, 246, 247, 251, 252
See application file for complete search history.

(56) References Cited

U.S. PATENT DOCUMENTS

| | | | |
|---|---|---|---|
| 2006/0271350 A1* | 11/2006 | Chino et al. | 704/2 |
| 2007/0043552 A1* | 2/2007 | Omi et al. | 704/2 |
| 2008/0091407 A1* | 4/2008 | Furihata et al. | 704/4 |
| 2008/0109228 A1* | 5/2008 | Park et al. | 704/277 |

FOREIGN PATENT DOCUMENTS

| | | |
|---|---|---|
| FR | 2 851 352 A1 | 8/2004 |
| WO | 03/021796 A2 | 3/2003 |
| WO | 03/052624 A1 | 6/2003 |

* cited by examiner

*Primary Examiner* — Leonard Saint Cyr
(74) *Attorney, Agent, or Firm* — Davis & Bujold, PLLC; Michael J. Bujold

(57) ABSTRACT

An interpretation system that includes an optical or audio acquisition device for acquiring a sentence written or spoke in a source language and an audio restoration device for generating, from an input signal acquired by the acquisition device, a source sentence that is a transcription of the sentence in the source language. The interpretation system further includes a translation device for generating, from the source sentence, a target sentence that is a translation of the source sentence in a target language, and a speech synthesis device for generating, from the target sentence, an output audio signal reproduced by the audio restoration device. The interpretation system includes a smoothing device for calling the recognition, translation and speech synthesis devices in order to produce in real time an interpretation in the target language of the sentence in the source language.

12 Claims, 3 Drawing Sheets

AUTOMATIC SIMULTANEOUS INTERPERTATION SYSTEM

This application is a National Stage completion of PCT/FR2008/052077 filed Nov. 18, 2008, which claims priority from French patent application Ser. No. 07/59159 filed Nov. 19, 2007.

FIELD OF THE INVENTION

The present invention concerns an automatic simultaneous interpretation system. In linguistics, simultaneous interpretation means the oral restitution in a target language, progressively with the diction, of content spoken in a source language. The term of interpretation is preferred against the term of translation that strictly concerns written texts.

BACKGROUND OF THE INVENTION

Speech recognition devices are known according to the state of the art. For example, the software marketed under the name "Dragon Naturally Speaking" by the SCANSOFT Company allows transcribing on the screen a text dictated by a speaker. While reading in a loud voice, the speaker enriches the text with information relating to the written form of ambiguous terminations, to the punctuation, etc.

In addition, there is translation software that allows translating text in a source language into a text in a target language. For example, the Systran software, marketed by the company having the same name, enables automatic translation based on grammatical and stylistic rules and on a dictionary that may be capable of being updated.

Further and lastly, there is speech synthesis software, capable of producing an audio restoration of a text displayed, for example, on the screen of a computer. The software marketed under the brand name "Speak Back" based on a France TELECOM technology, is an example of such speech synthesis software.

The document WO-2003-052624 describes an interpretation system of a type that includes: at least one device for the acquisition of a sentence pronounced in a source language and at least one device for restoring the sound; a speech recognition device for generating from an input signal acquired from the sound acquisition device, a source sentence that is a transcription of the sentence pronounced in the source language; a translation device for generating a target sentence that is a translation of the source sentence into a target language; and a speech synthesis device for generating, from the target sentence, an audio output signal capable of being restored by the sound restoration device.

However, the interpretation system described appears to be only the juxtaposition of speech recognition devices, translation devices and speech synthesis devices. In particular, the interpretation system described does not include devices so that the processing of a sentence, from its acquisition until its restoration may be realized efficaciously.

SUMMARY OF THE INVENTION

The purpose of the invention is therefore to remedy this problem by proposing an improved interpretation system that can allow the processing of a sentence to be realised in real time, that is, by reducing the idle time during the processing.

For this purpose, the object of the invention is an interpretation system of the above mentioned type, characterised in that it includes a smoothing device capable of calling sequentially the recognition, translation and speech synthesis devices for producing, in real time, an interpretation in the target language of the sentence in the source language.

According to particular embodiments, the system includes one or more of the following characteristics, taken in isolation or according to all the possible technical combinations:

the translation device includes a dictionary from the source language to the target language, the speech synthesis device includes a phonetic dictionary associating the written form of a word to a series of phonemes and a set of rules for the pronunciation of the phonemes in the target language for producing the output audio signal, the smoothing device includes means of communication allowing an exchange of messages between the recognition, translation and speech synthesis devices on the one hand and the smoothing device on the other hand, the means of communication include a queuing system associated in input of each of the recognition, translation, speech synthesis and smoothing devices, a message contains a request and an argument, the acquisition device is an optical acquisition device and the recognition device is a recognition device capable of producing the source sentence from a sentence written in the source language acquired by the optical acquisition device, the acquisition device is a sound acquisition device and the recognition device is a speech recognition device capable of producing the source sentence from a sentence pronounced in the source language acquired by the sound acquisition device, the speech recognition device includes:
  a means of identifying the phonemes allowing the breakdown of the input audio signal into a sequence of phonemes,
  a means of grouping the phonemes among themselves for forming a sequence of phoneme groups from the sequence of phonemes, and
  a transcription device capable of associating with a group of phonemes the written form of a word so as to produce a source sentence from a sequence of groups of phonemes, the transcription device including a directory of the source language associating with a group of phonemes a group of written forms of words and a set of rules allowing the selection of a particular written form from among the group of written forms of words, it allows a bidirectional interpretation, the system being capable of producing, according to a first channel, an interpretation in a second target language of a speech in a first source language and to produce, according to a second channel, an interpretation in a second target language of a speech in a second source language, the first source language and the second target language on the one hand and the second source language and the first target language on the other hand being identical, the system including in addition a first audio acquisition device and a first audio restoration device and a second audio acquisition device and a second audio restoration device, it includes a first speech recognition device specific to the first source language and a second speech recognition device specific to the second source language, the translation and speech synthesis devices functioning for one or other of the first and second channels, it includes a first speech recognition device, a first translation device and a first speech synthesis device specific to the first channel and a second speech recognition device, a second translation device and a second speech synthesis device specific to the second interpretation channel.

BRIEF DESCRIPTION OF THE DRAWINGS

The invention shall be better understood by reading the following description, given only as an example and by referring to the enclosed drawings, in which.

DETAILED DESCRIPTION OF THE PREFERRED EMBODIMENTS

Figure 1:
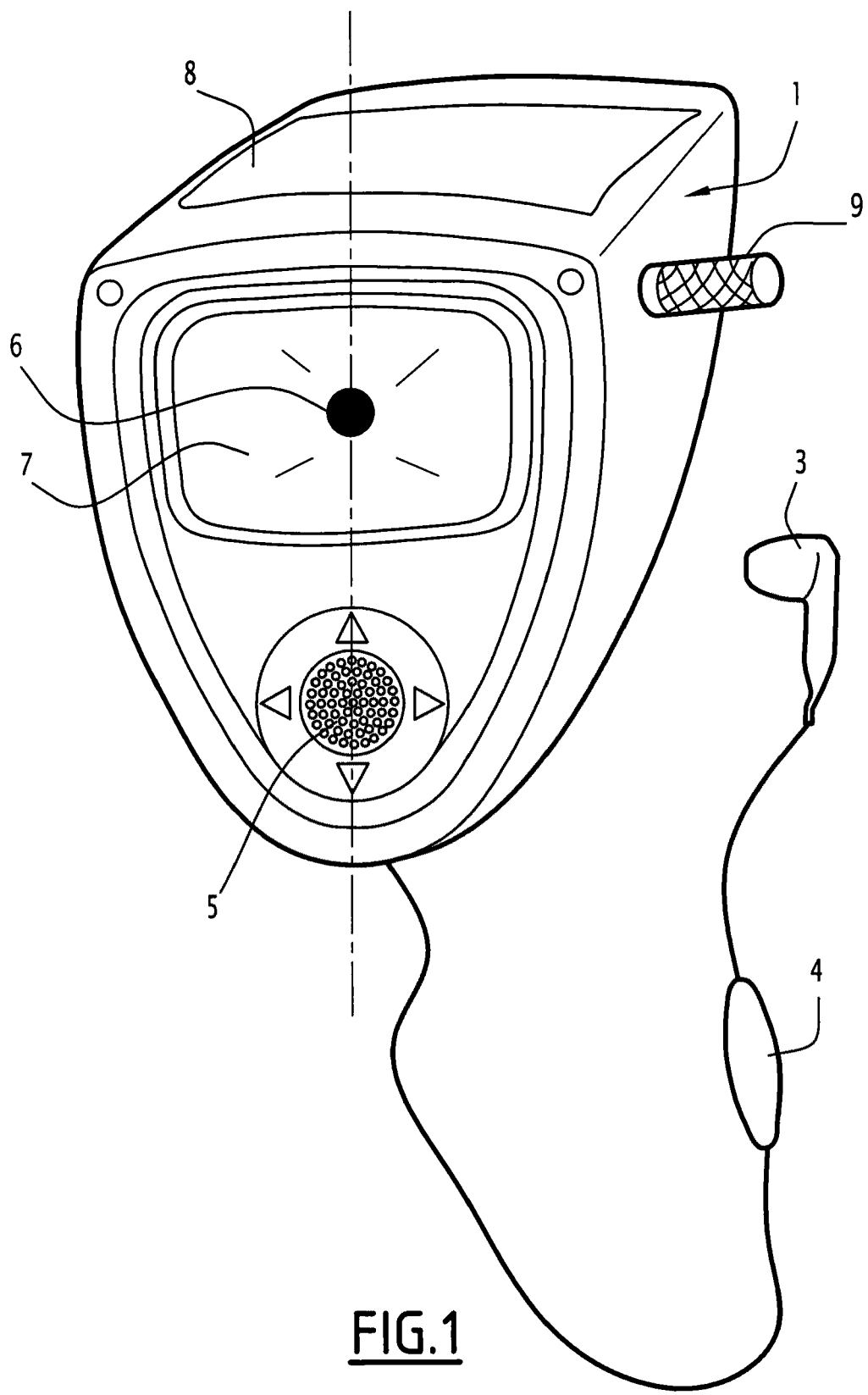
FIG. 1 is an artist's representation of the interpretation system in a portable embodiment.

With reference to the FIG. 1, a portable embodiment of the simultaneous interpretation system according to the invention is represented. It is in the form of a box 1 of small dimension that the user can carry around the neck by means of a strap.

The system is equipped with an earphone 3 and a first microphone 4 that form respectively a first audio restoration device and a first audio acquisition device for the user of the interpretation system.

The system is equipped with a small loudspeaker 5 and a second microphone 6 fitted in the bottom of a cavity 7, forming respectively a second audio restoration device and a second audio acquisition device for a participant. These second devices 5 and 6 are placed on the same front panel of the box 1.

By participant, we mean here in general the individual with whom the user wishes to communicate verbally. One can note that this participant may be undefined in the case of a use of the system for capturing ambient sounds produced by various sources.

The system is bidirectional because it allows both the interpretation of the speech of the participant expressing himself in a language L2 towards a language L1 understood by the user, as well as the interpretation of the speech of the user expressing himself in the language L1 toward the language L2 of the participant. A first channel of operation thus corresponds to the processing of the input audio signal captured by the first microphone 4, the language L1 then corresponds to the source language, for producing an output audio signal emitted by the second loudspeaker 6, the language L2 then appears as the target language of this first channel.

Inversely, a second operating channel corresponds to the processing of the audio signal captured by the second microphone 6, the language L2 corresponds here to the source language, for producing a signal emitted by the first loudspeaker 3, the language L1 then appears as the target language of this second channel.

In the top part of the box 1, the user has a screen 8 for displaying information and a button 9 for interacting with the system. The button 9 may be for example a rotating and clickable knob for selecting an item in a scrolling menu present on the screen.

Figure 2:
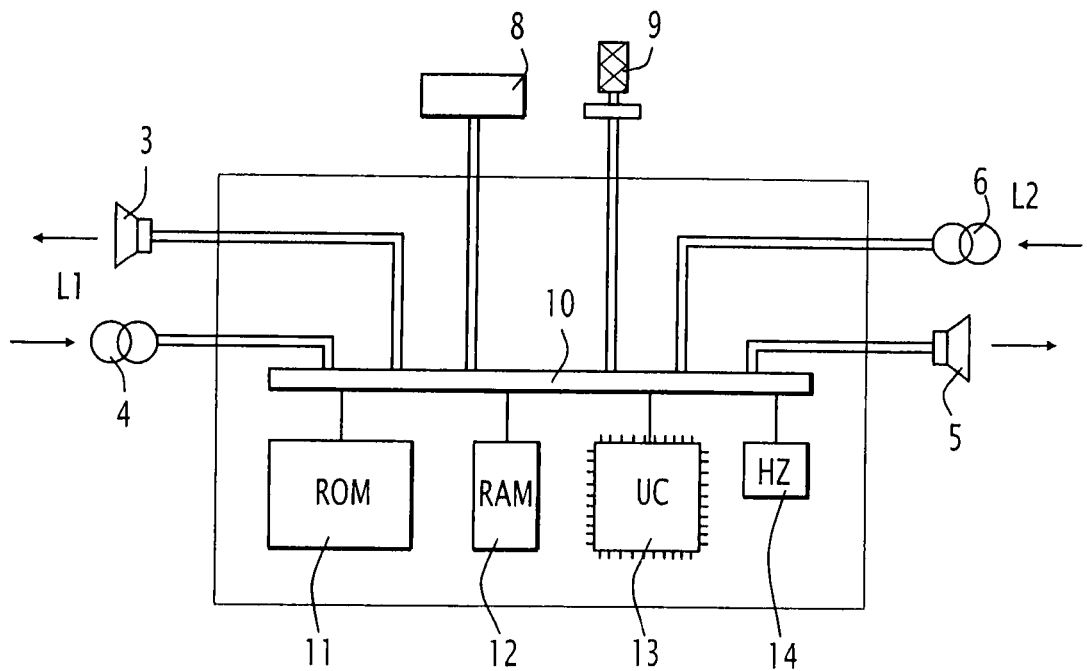
FIG. 2 is a schematic representation of the hardware part of the system of FIG. 1.

With reference to the FIG. 2, the system includes in its hardware part memory devices, such as a ROM memory 11 and a RAM memory 12, processing means, such as a processor 13, and an input/output interface 10 for handling the exchange of digital signals with the first and second microphones 4 and 6, the earphone 3 and the loudspeaker 5, besides the hardware devices for the interface, the screen 8 and the selection knob 9, for example.

Figure 3:
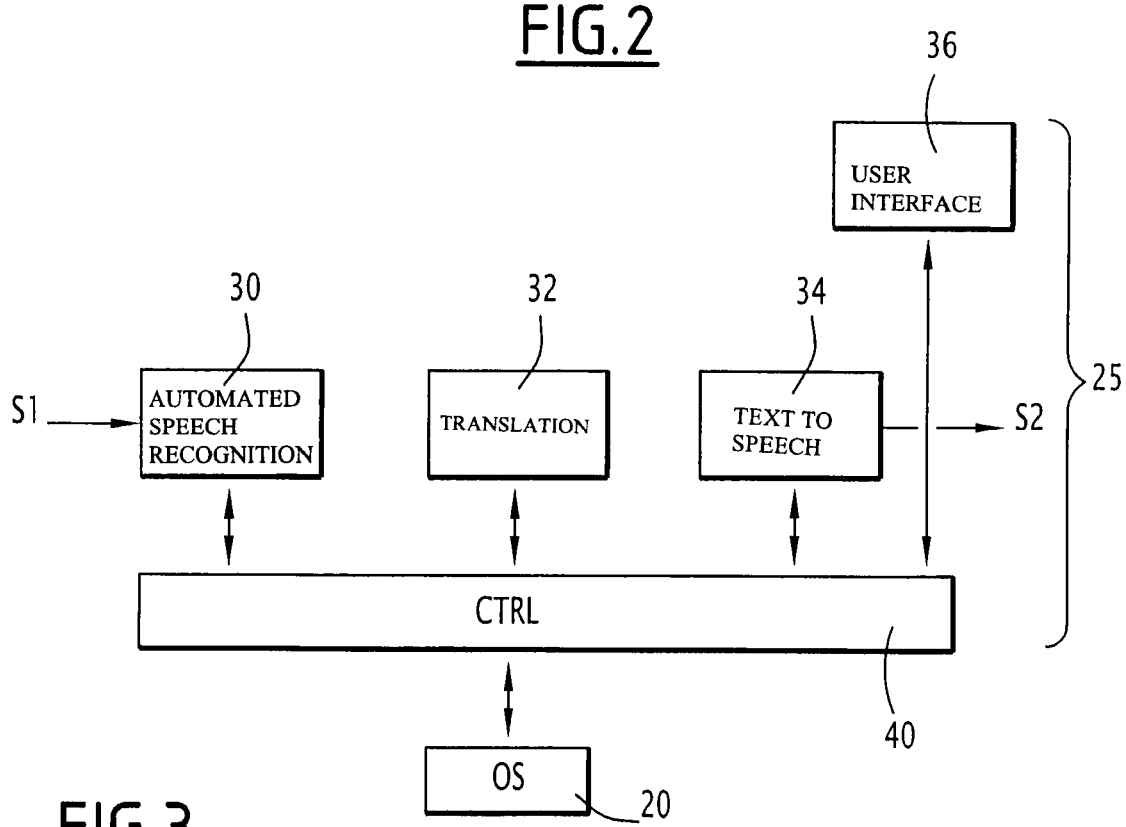
FIG. 3 is a layout diagram of the different modules in the software part of the system shown in FIG. 1.

In the FIG. 3, the software part of the system according to the invention is an application 25 running with an operating system 20 for the hardware part, such as the software Windows XP developed by the MICROSOFT company. The application package for simultaneous interpretation 25 includes a series of instructions, stored in the ROM memory 11 and capable of being executed by the processor 13.

For greater clarity, and by limiting to the data processing according to the first channel, the application 25 is made up of a set of software modules represented diagrammatically in the FIG. 3.

A first module 30, for speech recognition ("Automated Speech Recognition") takes as input an audio signal generated by the first audio acquisition device and transcribes it in real time into a source sentence. A source sentence is an object of the text type corresponding to an estimate of the sentence effectively pronounced. This first module 30 contains a table of phonemes characteristic of the source language, a directory associating a group of phonemes of the source language with a group of written forms of words as well as a set of rules for selecting a particular written form from this group of written forms, depending, for example, on the context, the words coming before and after the word under consideration, etc.

A second module 32, called translation ("Translation") takes as input the source sentence and translates it from the source language to the target language. The translation module 32 produces a target sentence. A target sentence is a text type object corresponding to an estimated translation of the source sentence. This second module 32 contains a dictionary associating a word of the source language with a group of words in the target language and a set of translation rules allowing the selection of a particular word from this group of words, for example based on the context in which the word under consideration is used.

A third module 34, called pronunciation or speech synthesis ("Text to speech") takes as input the target sentence and synthesises an output audio signal. This signal, transmitted to the second audio restoration device, corresponds to a sequence of phonemes in the target language generating an audio reproduction of the target sentence. This third module 34 contains a phonetic dictionary associating with a word in the target language a sequence of phonemes, as well as a pronunciation table associating with a phoneme an elementary audio signal for the pronunciation.

A user interface module 36 allows displaying the data on the screen 8 and offers to the user the possibility of entering data by means of the knob 9. In an embodiment variant, the module 36 displays the text in language L1 output from the recognition module 30 and/or in language L2 output from the translation module 32 on the display system 8 for allowing the user to filter and enrich these displayed texts before validating them for the following elementary operation.

Lastly, the application 25 contains a smoothing module 40. The smoothing module 40 is made up of a state machine.

In the configuration state, the module 40 sets the system configuration according to user preferences. The modifiable configuration parameters are for example, the language L1, the language L2, an identifier of the user for whom the speech recognition module 30 would have "learned" to recognise the voice, the rendering of the synthesised voice, etc. These configuration parameters are grouped into a profile saved into the system.

In a processing state, the smoothing module 40 plays the role of a low level interface linking the various modules 30, 32, 34, 36. It ensures the sequencing of the different elementary operations of the process of interpreting a pronounced sentence. It is capable of activating in a coordinated manner the modules 30, 32 and 34 for producing in real time the interpretation of a sentence. That is, producing an interpretation while eliminating the latency period between two elementary operations carried out by two different modules 30, 32 or 34.

For this purpose, the smoothing module 40 implements communication services between the four independent modules 30-36. The communication between modules is based on the exchange of messages. A message contains a request, a translation demand, for example, or signals an event, a completed translation, for example. This message may also contain one or more arguments applicable to the request.

The smoothing module 40 contains a mechanism for exchanging messages from the modules 30, 32 and 34 to the module 40. The messages sent by the modules 30, 32 and 34 to the smoothing module 40 are respectively: "sentence recognized" from the module 30 with, as argument, text corresponding to a sentence in source language; "translation completed" from the module 32 with, as argument, text corresponding to a sentence in target language; and "voice synthesized" from the module 34 indicating that the output speech signal has been completely transmitted.

The smoothing module 40 contains a mechanism for exchanging messages from module 40 to modules 30, 32 and 34. These messages are respectively: "indication of audio signal" to the module 30, having as argument, a digitized data block representing a sampled speech signal; "request for translation" to the module 32 with, as argument, text corresponding to a sentence in the source language; and "request for speech synthesis" to the module 34 with, as argument, text corresponding to a sentence in the target language.

Lastly, the smoothing module 40 contains a queuing mechanism. A queue is associated with the input of each of the modules 30, 32, 34, 36 and 40. This queuing mechanism allows placing the results of an elementary processing operation in instant memory while waiting until the next module in the processing sequence can start the processing of the result. When a module sends a message to another module, the transmitted message is placed in the queue at the input of the destination module. When the destination module is inactive, it is waiting for a change of status in its queue, that is, waiting for the arrival of a message. When such a message arrives, the destination module switches to an active state. It then extracts from its queue the message received, executes the processing required by the content of this message, sends as output one or more messages to one or more different modules, then switches back to an inactive status. If a new message is placed in the queue of the destination module while it is in the active state, this message remains in the queue until this module has an opportunity to switch in to the inactive state for scanning its queue. If several messages are present in the queue, the messages accumulate in the order in which they are received and are processed by the destination module according to this order of arrival.

When the system is powered on, the smoothing module 40 is activated and it controls all the operations until the system is powered off.

The module 40 may be in one of its two principal states of "configuration" or "processing", each of these two states have their sub-states.

During the configuration state, the system is in a configuration stage during which the user creates or selects a profile via the interface module 36. For example, an option for selecting the languages in the interface module 36 allows choosing on the screen 8, from a scrolling menu, the source and target languages. The associated dictionaries will then be loaded into the RAM memory during the initialization stage for working with the translation module 32. In addition, an option for selecting the sound level of the interface module 36 allows selecting the threshold value of the second microphone 6 turned towards the exterior so as to translate the speech of a particular speaker (high threshold value) or for translating all the sounds captured from the environment (reduced or low threshold value).

When, acting on a user request, the smoothing module 40 switches from the configuration state to the processing state, it initializes the three modules 30, 32 and 34 with the selected parameters. These three modules are then executed.

The processing sequence with regard to a spoken sentence will now be described in detail.

During its execution, the recognition module 30 starts monitoring the first audio acquisition device. The recognition module 30 analyzes the input signal for detecting a sentence spoken in the source language. This mechanism will be described below in greater detail. When the recognition module 30 detects such a sentence, the resulting source sentence object is placed, by the recognition module 30 in the queue of the smoothing module 40 in the form of an argument for a "sentence recognized" message.

When the smoothing module 40 extracts from its queue a "sentence recognized" message, it places the source sentence argument of this message in the input queue of the translation module 32, in the form of an argument for a "translation request" message.

As a variant, the treatment process includes an additional stage consisting of displaying the source sentence on the screen 8 through the module 36, so that it is validated by the user before its translation is called for by the module 32.

During its execution, the translation module 32 goes into its inactive input queue monitoring mode. When it finds a "translation request" message, it translates the sentence source input as argument of this message. This elementary operation may take some time. When the source sentence is translated, the translation module 32 sends to the smoothing module 40 a "translation completed" message, with the target sentence as argument.

When the smoothing module 40 is not busy, it examines its messages queue. When its finds a "translation completed" message, it takes the target sentence and sends a "speech synthesis request" message to the speech synthesis module 34 with the target sentence as argument of the message.

As a variant, the treatment process includes an additional stage consisting of displaying the target sentence on the screen 8 through the module 36, so that it is validated by the user before its synthesis into speech by the module 34 is requested.

When it is launched, the speech synthesis module 34 places itself in waiting state for a request for speech synthesis of a target sentence. In the meantime, the speech synthesis module 34 generates a constant signal, typically silence, towards the audio restoration device of the channel.

When the speech synthesis module 34 is not busy with the synthesis of the previous target sentence, it examines its file of messages for input. When it finds a "speech synthesis request" message, it synthesises the target sentence received as argument of this message and transmits a corresponding signal to the audio restoration device. Here again, this elementary operation may require several seconds. When the transmission of the audio signal has been completed, the speech synthesis module 34 sends a "synthesis completed"

message to the smoothing module 40 and generates an audio signal corresponding to silence.

It must be noted that the interface module 36 can display on the screen 8 a symbolic visual description of the progress of the treatment process with regard to the current sentence.

Figure 4:
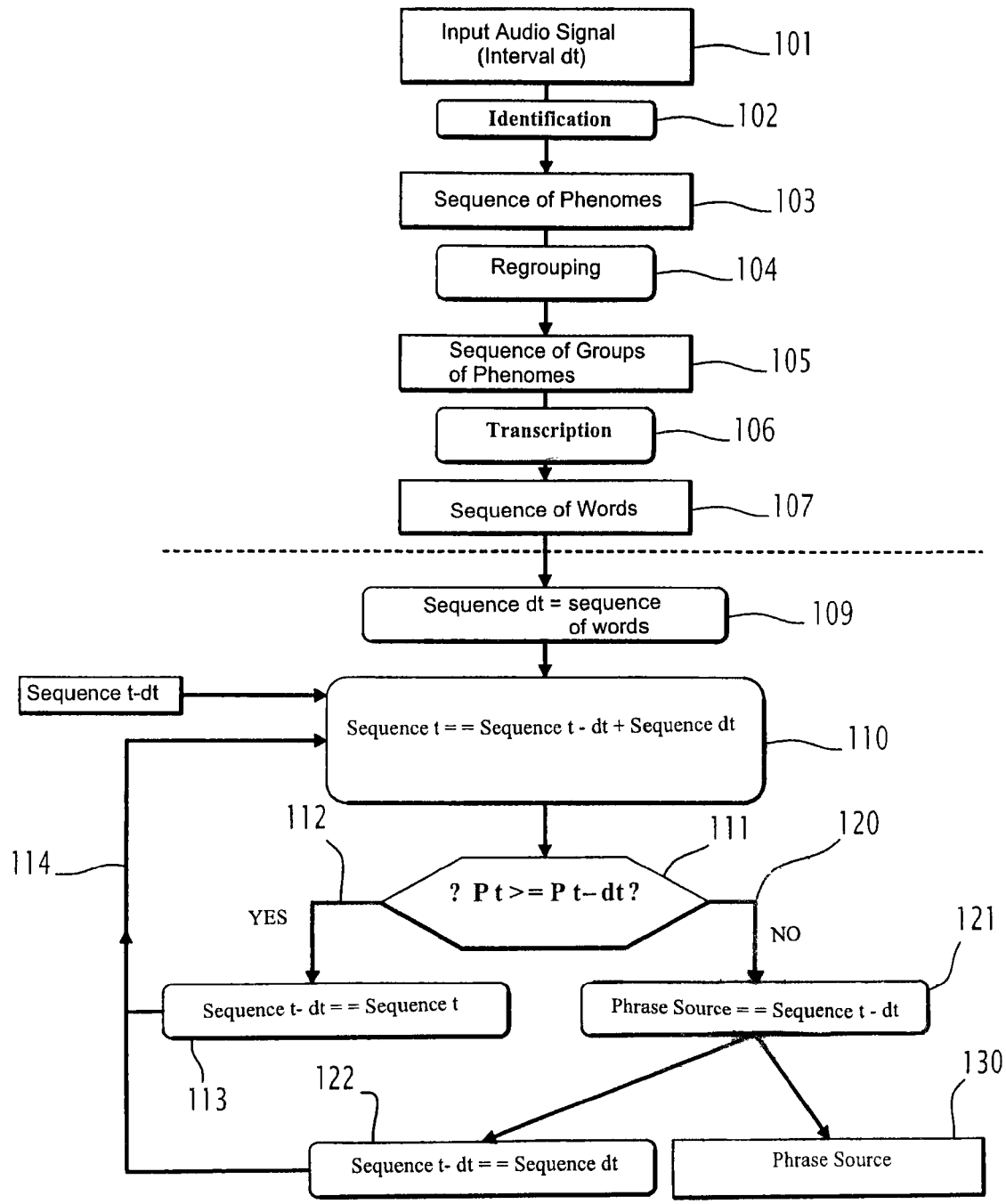
FIG. 4 is a flow chart showing the operation of the recognition module of FIG. 3.

The speech recognition module 30 should resolve the difficulty arising from the fact that the unit of meaning, whose translation corresponds best to the idea expressed by the speaker, terminates in its written form with a full stop. However, orally, this element of termination for the unit of meaning does not exist. It is therefore necessary to estimate the end of a sentence. The flow chart of the FIG. 4 represents diagrammatically the elementary processing operations performed by the speech recognition module 30 according to the invention.

During an interval dt, which is the variable period corresponding to the time separating two blanks in the speech captured as input of the channel, the input audio signal 101 is analyzed for recognizing the phonemes contained in it. For memory, a given language contains only a limited number of phonemes. The result of this identification stage 102 is a sequence of phonemes 103 during the interval dt.

Then, the phonemes of this sequence of phonemes 103 are grouped with one another during a grouping stage 104. The result of this operation is the production of a sequence of groups of phonemes 105. Each of these groups of phonemes is then associated with a particular written form. This takes place during the transcription stage 106 that uses the directory associating with a group of phonemes a group of written forms of words and that then applies the rules allowing the selection of a particular written form from among the group of written forms of words. Finally, a sequence of words 107 during the interval dt, that is a variable of type text, is produced. The elementary processing that was described above takes place in real time, simultaneously with the speech being delivered. The sequences of words of a different time interval are saved into the memory.

In fact, a sequence of words 107 is text to which is associated a probability quantifying the relevance that the transcription operations effectively reproduce the piece of sentence that was spoken.

The speech recognition module 30 includes means of estimating the end of a sentence that associate several sequences of words for trying to produce a source sentence. These means of estimation are represented in the bottom part of the flow chart in the FIG. 4. For this purpose, the speech recognition module 30 extracts the last sequence of words 107 and assigns it to a Sequence variable at dt. At the stage 110, a value of the Sequence variable at the instant t is obtained by the concatenation of the current value of a Sequence variable at the instant t-dt and the value of the variable Sequence at dt.

At the stage 111, the probability of the Sequence object at t is compared with the value of the probability of the Sequence object at t-dt.

If the probability associated with the Sequence object at the instant t is higher than the probability that was associated with the Sequence object at the instant t-dt, then the Sequence object at the instant t is closer to a unit of meaning than the Sequence object at the previous instant t-dt. The processing then continues by following the link 112 and the Sequence object at the instant t is saved in memory as Sequence at the previous instant t-dt (stage 113) with a view to processing the following sequence of words 107 in time. The execution of the module 30 then loops back to stage 110 through link 114.

On the other hand, if the probability associated with the Sequence object at the instant t is lower than the probability associated with the Sequence object at the instant t-dt, this signifies that the Sequence object at the instant t is farther from the unit of meaning in comparison with the Sequence object at the instant t-dt. The execution of the module 30 then continues by following the link 120. The value of the Sequence object at the previous instant t-dt is assigned to a Source sentence object at the stage 121 because it is considered that this sequence forms a unit of meaning. For processing the sequence of words 107 at the next interval dt, the Sequence object at the instant t-dt is initialized (stage 122) with the sequence of words 107 at the current interval dt that was not retained for forming the source sentence because it was considered that this sequence forms the start of another source sentence. Thus, the speech recognition module 30 generates a source sentence 130. The execution of the module 30 then loops back to stage 110 through link 114.

Several embodiments are envisaged for implementing a bidirectional system capable of generating a simultaneous interpretation through the first and second channels.

In an embodiment with two actual machines, the system includes two identical hardware parts, each hardware part being dedicated to one of the two translation channels. The first actual machine is connected for example to the first audio acquisition device and to the second audio restoration device, while the second actual machine is connected to the second audio acquisition device and to the first audio restoration device. Each hardware part runs an operating system 20 and the application 25. The processing according to the first channel is thus completely decoupled from the processing according to the second channel. Each actual machine may have its own screen and its own interface module 36 or share the same screen with a common interface module 36.

In a second embodiment with two virtual machines, the system is made up of a single hardware part on which two operating systems 20 run simultaneously. Each operating system 20 defines a virtual machine executing the interpretation application 25. Each virtual machine is dedicated to a particular channel.

Lastly, in a third embodiment, the system is made up of a hardware part and a single operating system. Either, the system runs simultaneously two instantiations of the application 25, each of them being dedicated to a particular channel. The application 25 is then duplicated so that the interpretation system is made up of a first application dedicated to the processing of data specific to the first channel and a second application dedicated to the processing of data specific to the second channel. Thus, the recognition module 30 of the first application contains a directory of the language L1, while the recognition module of the second application contains a directory of the language L2. Similarly, the translation module 32 of the first application contains a dictionary of the language L1 to the language L2, while the translation module of the second application contains a dictionary of the language L2 to the language L1. Lastly, the speech synthesis module 34 of the first application contains a pronunciation chart of the language L1, while the speech synthesis module 34 of the second application contains a pronunciation chart of the language L2. In this embodiment, the two modules may be executed "simultaneously" by sharing the processor time.

Alternatively, the same translation 32 and speech synthesis 34 modules are used for the two channels. One of these modules is thus called by the smoothing module 40 with additional parameters relating to source and target languages. It is the smoothing module 40 that controls the calling of these modules sequentially; the execution of a module has to be completed before the module can be called again for an operation relating to the same or to the other channel.

On the other hand, the interpretation software application for this embodiment contains advantageously two speech recognition modules 30, dedicated respectively to the recognition in real time of the audio signal transmitted by the microphone placed at the input of the associated channel. As a variant, the system may comprise another screen allowing the participant to monitor and if necessary to intervene in the processing sequence according to the second channel, from the language L2 to the language L1.

The system may include a scanner connected to the input of an optical recognition module capable of producing a source sentence from the optical recognition of characters read by the scanner.

In yet another variant, the system contains an input/output interface adapted for allowing the connection and the operation of the interpretation system on a telephone as a second audio acquisition device and second audio restoration device. The professional man can understand that the or each acquisition device and the or each audio restoration device may be linked with the hardware part of the system through a wireless connection so as to be used at a distance from the system.

The invention claimed is:

1. An interpretation system for interpretation, on a sentence by sentence basis, in real time, the interpretation system comprising:
    at least one acquisition device (4, 6) for acquiring a sentence in a source language and at least one audio restoration device (3, 5) for generating sound in a target language;
    a smoothing device (40) for sequentially controlling operation of each of a recognition device (30), a translation device (32) and a speech synthesis device (34), and the smoothing device (40) the recognition device (30), the translation device (32) and the speech synthesis device (34) facilitating exchange of command messages which assist with real time interpretation on a sentence by sentence basis;
    the recognition device (30) generating, from an input signal acquired by the acquisition device of the sentence in the source language, a transcription of an estimate of a pronunciation of the sentence in the source language and sending the transcription of the estimate of the pronunciation of the sentence in the source language to the smoothing device (40), and the recognition device (30) estimating an end of a sentence by associating a sequence of phonemes during an interval of time bounded by gaps in the source language (dt), and assigns probabilities of different lengths of sequences of phonemes as being indicative of the end of the sentence;
    the translation device (32) for receiving, from the smoothing device (40), the transcription of the estimate of the pronunciation of the sentence in the source sentence in source sentence and generating and sending to the smoothing device (40) a target sentence that is a translation, in the target language, of the transcription of the estimate of the pronunciation of the sentence in source sentence; and
    a speech synthesis device (34) for generating an output audio signal, from the target sentence that is the translation, in the target language, of the transcription of the estimate of the pronunciation of the sentence from the smoothing device (40), and supplying the output audio signal, in the target language, for restoration by the audio restoration device (3, 5);
    wherein the recognition device (30) recognizes a word in the source sentence from the input signal based on a set of rules for selecting a written form of the word based on a context in which the word is used including considering at least one word preceding the word in the source sentence and at least one word following the word in the source sentence; and
    in a configuration state, smoothing device (40)
        sets a system configuration according to a user preference, including at least one of the source language, the target language, and an identifier of a user for whom the speech recognition device (30) may be programmed to optimize specifically to the user's voice, and
        groups and saves preferences in to a profile into the system; and
    in a processing state, the smoothing device (40) is a low level interface linking the recognition device (30), the translation device (32), the speech synthesis device (34), and an interface device (36).

2. The system according to claim 1, wherein the smoothing device (40) includes a plurality of communication devices to facilitate an exchange of messages between the recognition device (30), the translation device (32) and the speech synthesis device (34), and the smoothing device (40).

3. The system according to claim 2, wherein the communication devices include a queue associated with an input of each of the recognition device (30), the translation device (32), the speech synthesis device (34), and the smoothing device (40).

4. The system according to claim 2, wherein the message contains a request and an argument.

5. The system according to claim 1, wherein the translation device (32) comprises a dictionary from the source language to the target language.

6. The system according to claim 1, wherein the speech synthesis device (34) comprises a phonetic dictionary associating a written form of a word with a sequence of phonemes and a set of rules for pronunciation of phonemes of the target language for producing the output audio signal.

7. The system according to claim 1, wherein the acquisition device is an optical acquisition device and the recognition device is an optical recognition device which produces the source sentence from a sentence written in the source language acquired by the optical acquisition device.

8. The system according to claim 1, wherein the acquisition device is an audio acquisition device (4, 6) and the recognition device is a speech recognition device (30) which produce the source sentence from a sentence spoken in the source language acquired by the audio acquisition device.

9. The system according to claim 8, wherein the speech recognition device (30) includes:
    a device for identifying phonemes to break down an input audio signal into a sequence of phonemes;
    a grouping system for grouping the phonemes among themselves for forming a sequence of groups of the phonemes based on the sequence of phonemes; and
    a transcription device for associating a written form of a word with a group of phonemes, to produce the source sentence based on the sequence of groups of phonemes, the transcription device comprising a directory of the source language for associating with a group of phonemes, a group of written forms of words and a series of rules for selecting a particular written form of the words from among the group of the written forms of the words.

10. The system according to claim 8, wherein the interpretation system facilitates bidirectional interpretation, the interpretation system producing, according to a first channel of interpretation, an interpretation, into a second target language, of speech in a first source language and producing, according to a second channel of interpretation, an interpretation, into a first target language, of speech in a second source language, the first source language and the second target language and the second source language and the first target language is identical, the interpretation system including a first audio acquisition device (4) and a first audio restoration device (3) and a second audio acquisition device (6) and a second audio restoration device (5).

11. The system according to claim 10, further comprising a first speech recognition device specific to the first source language and a second speech recognition device specific to the second source language, and the translation and speech synthesis devices operating for at least one of the first and the second channels of interpretation.

12. The system according to claim 10, further comprising a first speech recognition device, a first translation device and a first speech synthesis device specific to the first channel of interpretation and a second speech recognition device, a second translation device and a second speech synthesis device specific to the second channel of interpretation.

* * * * *